United States Patent
Pan et al.

(10) Patent No.: US 9,170,130 B2
(45) Date of Patent: Oct. 27, 2015

(54) FIBER-OPTIC SENSOR DEVICE HAVING A SECOND FIBER BRAGG GRATING UNIT TO REFLECT LIGHT PASSING THROUGH A FIBER OPTIC SENSOR

(71) Applicant: INDUSTRIAL COOPERATION FOUNDATION CHONBUK NATIONAL UNIVERSITY, Jeonju-si, Jeollabuk-do (KR)

(72) Inventors: Jae Kyung Pan, Jeonju-si (KR); Sang Jin Choi, Gimje-si (KR)

(73) Assignee: INDUSTRIAL COOPERATION FOUNDATION CHONBUK NATIONAL UNIVERSITY, Jeonju-Si, Jeollabuk-Do (KR)

(*) Notice: Subject to any disclaimer, the term of this patent is extended or adjusted under 35 U.S.C. 154(b) by 17 days.

(21) Appl. No.: 14/352,009

(22) PCT Filed: Dec. 31, 2012

(86) PCT No.: PCT/KR2012/011861
§ 371 (c)(1),
(2) Date: Apr. 15, 2014

(87) PCT Pub. No.: WO2013/100742
PCT Pub. Date: Jul. 4, 2013

(65) Prior Publication Data
US 2014/0299753 A1  Oct. 9, 2014

(30) Foreign Application Priority Data

Dec. 29, 2011  (KR) .................. 10-2011-0146515

(51) Int. Cl.
*G01J 1/04* (2006.01)
*G01D 5/26* (2006.01)
*G01K 11/32* (2006.01)
*G01D 5/353* (2006.01)
*G02B 6/02* (2006.01)

(52) U.S. Cl.
CPC ............ *G01D 5/268* (2013.01); *G01D 5/35354* (2013.01); *G01K 11/3206* (2013.01); *G02B 6/0208* (2013.01)

(58) Field of Classification Search
CPC ....... G01D 5/35316; G01D 5/38; G01L 1/246
USPC ........ 250/227.14–227.23, 214 R, 214.1, 221; 385/10, 12, 37; 356/477–479
See application file for complete search history.

(56) References Cited

U.S. PATENT DOCUMENTS 6,097,487 A      8/2000  Kringlebotn et al.
6,680,472 B1 *   1/2004  Thingbo et al. ........... G01J 9/00
                                                            250/227.12

FOREIGN PATENT DOCUMENTS

| JP | 2000-283846 A | 10/2000 |
| JP | 2004-233070 A | 8/2004 |
| JP | 2006-138757 A | 6/2006 |

OTHER PUBLICATIONS

International Search Report for International Application No. PCT/KR2012/011861.

*Primary Examiner* — Que T Le
(74) *Attorney, Agent, or Firm* — LRK Patent Law Firm

(57) ABSTRACT

Provided is a fiber-optic sensor device. The fiber-optic sensor device is capable of sensing a change in physical quantity by using two fiber Bragg grating units arranged within an optical fiber and a fiber-optic sensor unit arranged therebetween, thereby implementing a low cost fiber-optic grating sensor having a simple structure without requiring a reference FBG.

8 Claims, 1 Drawing Sheet

FIBER-OPTIC SENSOR DEVICE HAVING A SECOND FIBER BRAGG GRATING UNIT TO REFLECT LIGHT PASSING THROUGH A FIBER OPTIC SENSOR

TECHNICAL FIELD

The present invention relates to a fiber optic sensor device, and more specifically, to a fiber optic sensor device for sensing a physical quantity using a fiber Bragg grating.

BACKGROUND ART

An optical fiber grating widely used for optical communication and fiber optic sensor devices is generally manufactured by the change of a refractive index of a fiber optic core which is generated by radiating strong ultraviolet rays on the optical fiber.

At this point, the optical fiber grating is classified as a short period optical fiber grating and a long period optical fiber grating according to the characteristic of the optical fiber, such as a refractive index modulation period or the like, and studied and used as a reflection and penetration filter or the like in relation to the wavelength based on the characteristic.

In addition, a fiber Bragg grating induces periodic changes of the refractive index of the optical core in the axial direction. The optical fiber grating has a characteristic of reflecting only the rays satisfying a Bragg condition and having a narrow line width (generally, 0.1 to 1 nm) around a Bragg wavelength and passing rays of the other wavelengths. If temperature of the fiber Bragg grating is changed or a stress is applied to the fiber Bragg grating, the Bragg wavelength also is changed. Accordingly, a variety of fiber-optic grating sensors for measuring temperature, strain, pressure or the like using the characteristic have been developed.

However, since the fiber-optic grating sensor requires an expensive reference fiber Bragg grating (FBG), it is expensive and has a complex structure. Accordingly, development of a measure for implementing a fiber-optic grating sensor of a low price and a simple structure is required.

DISCLOSURE OF INVENTION

Technical Problem

Therefore, the present invention has been made in view of the above problems, and it is an object of the present invention to provide a fiber optic sensor device for sensing a change in physical quantity by using two fiber Bragg grating units arranged within an optical fiber and a fiber optic sensor unit arranged therebetween.

Technical Solution

To accomplish the above object, according to one aspect of the present invention, there is provided a fiber optic sensor device including: a light source for generating light; an optical fiber into which the light generated by the light source enters; a first fiber Bragg grating unit arranged in the optical fiber to reflect some of the light generated by the light source; a fiber optic sensor unit arranged in the optical fiber to change intensity of the light passing through the first fiber Bragg grating unit based on a specific physical quantity; a second fiber Bragg grating unit arranged in the optical fiber to reflect some of the light passing through the fiber optic sensor unit; and a monitoring unit for sensing the specific physical quantity changed by the fiber optic sensor unit based on a ratio of intensity of light between a reflected light reflected by the first fiber Bragg grating unit and a reflected light reflected by the second fiber Bragg grating unit.

In addition, the monitoring unit may include: a filter unit for selectively passing a first reflected light reflected by the first fiber Bragg grating unit and a second reflected light reflected by the second fiber Bragg grating unit; an photoelectric conversion unit for converting the first reflected light and the second reflected light passing through the filter unit into a first electrical signal and a second electrical signal, respectively; and a signal processing unit for calculating a ratio of strength of light between the first reflected light and the second reflected light using the first electrical signal and the second electrical signal and sensing the specific physical quantity changed by the fiber optic sensor unit based on the ratio of strength of light.

In addition, the filter unit may be a variable Fabry-Perot (F-P) filter for selectively passing light of a specific wavelength according to a bias voltage.

In addition, the photoelectric conversion unit may be a photo diode for converting light into an electrical signal.

In addition, the first fiber Bragg grating unit and the second fiber Bragg grating unit may have different Bragg reflection wavelength characteristics.

In addition, the fiber optic sensor unit may be an intensity-type fiber optic sensor for changing intensity of incident light according to the specific physical quantity and outputting the light.

In addition, the optical fiber may include n fiber Bragg grating units (n is a natural number) and n−1 fiber optic sensor units respectively arranged between the n fiber Bragg grating units, and the monitoring unit may sense the specific physical quantity changed by the fiber optic sensor unit arranged between two fiber Bragg grating units adjacent to each other within the optical fiber based on the ratio of strength of light between two reflected light reflected by the two adjacent fiber Bragg grating units.

In addition, there is provided m optical fibers (m is a natural number), and the fiber optic sensor device may further include a wavelength-division multiplexer for splitting light entering from the light source by wavelength and inputting the split light into the m optical fibers.

Advantageous Effects

According to various embodiments of the present invention, there is provided a fiber optic sensor device capable of sensing a change in physical quantity by using two fiber Bragg grating units arranged within an optical fiber and a fiber optic sensor unit arranged therebetween, and thus a low cost fiber optic grating sensor having a simple structure can be implemented without requiring a reference FBG.

BEST MODE FOR CARRYING OUT THE INVENTION

The present invention will be hereafter described in further detail with reference to the accompanying drawings.

Figure 1:
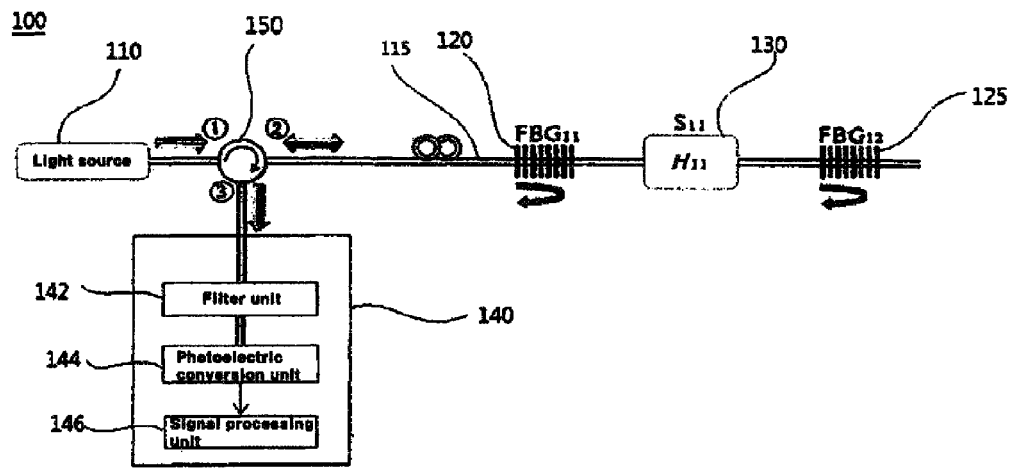
FIG. 1 is a view showing a fiber optic sensor device according to an embodiment of the present invention.

FIG. 1 is a view showing a fiber optic sensor device 100 according to an embodiment of the present invention. As shown in FIG. 1, the fiber optic sensor device 100 includes a light source 110, a first fiber Bragg grating unit 120, a second fiber Bragg grating unit 125, a fiber optic sensor unit 130 and a monitoring unit 140.

The light source 110 generates broadband light including all reflective wavelength bands of all fiber Bragg gratings (FBG) included in the fiber optic sensor device 100. In addition, the light source 110 inputs the generated light into an optical fiber 115 through a circulator 150.

The light generated by the light source 110 enters into the optical fiber 115. In addition, the first fiber Bragg grating unit 120, the second fiber Bragg grating unit 125 and the fiber optic sensor unit 130 are arranged in the optical fiber 115.

The first fiber Bragg grating unit 120 is arranged in the optical fiber 115 and reflects some of the light generated by the light source 110. A first reflected light reflected by the first fiber Bragg grating unit 120 enters into the monitoring unit 140 through the circulator 150.

The fiber optic sensor unit 130 is arranged in the optical fiber 115 and changes intensity of light passing through the first fiber Bragg grating unit based on a specific physical quantity. Specifically, the fiber optic sensor unit 130 is an intensity-type fiber optic sensor for changing intensity of incident light according to the specific physical quantity and outputting the light. Accordingly, if a specific physical quantity is applied to the fiber optic sensor unit 130, the fiber optic sensor changes intensity of the incident light and outputs the light. Specifically, the fiber optic sensor unit 130 changes intensity of incident light and outputs the light according to applied voltage, current, temperature, pressure, strain, a rotation rate, sounds, concentration of gas or the like.

The second fiber Bragg grating unit 125 (<<135) is arranged in the optical fiber 115 and reflects some of the light passing through the fiber optic sensor unit 130. In addition, a second reflected light reflected by the second fiber Bragg grating unit 125 (<<135) passes through the fiber optic sensor unit 130 and the first fiber Bragg grating unit 120 again and enters into the monitoring unit 140 through the circulator 150.

At this point, the first fiber Bragg grating unit 120 and the second fiber Bragg grating unit 125 have different Bragg reflection wavelength characteristics. Accordingly, the first reflected light and the second reflected light respectively have a different wavelength.

The monitoring unit 140 senses a specific physical quantity changed or applied by the fiber optic sensor unit 130 based on the ratio of strength of light between the first reflected light reflected by the first fiber Bragg grating unit 120 and the second reflected light reflected by the second fiber Bragg grating unit 125. As shown in FIG. 1, the monitoring unit 140 includes a filter unit 142, a photoelectric conversion unit 144 and a signal processing unit 146.

The filter unit 142 selectively passes the first reflected light reflected by the first fiber Bragg grating unit 120 and the second reflected light reflected by the second fiber Bragg grating unit 125. To this end, the filter unit 142 uses a variable Fabry-Perot (F-P) filter for selectively passing light of a specific wavelength according to a bias voltage. Accordingly, since the first reflected light and the second reflected light respectively have a different wavelength, the filter unit 142 may separately passes the first reflected light and the second reflected light.

The photoelectric conversion unit 144 converts the first reflected light and the second reflected light passing through the filter unit 142 into a first electrical signal and a second electrical signal, respectively. To this end, the photoelectric conversion unit 144 uses a photo diode for converting light into an electrical signal.

The signal processing unit 146 receives the first electrical signal and the second electrical signal. Then, the signal processing unit 146 calculates a ratio of strength of light between the first reflected light and the second reflected light using the first electrical signal and the second electrical signal and senses a specific physical quantity changed by the fiber optic sensor unit 130 based on the ratio of strength of light.

The fiber optic sensor device 100 of such a structure has a self-referencing characteristic capable of measuring changes in the output of the light source by using the ratio of light reflected by the two fiber Bragg gratings although the light source changes output over a short or long time period. Such a self-referencing characteristic does not need an expensive reference fiber Bragg grating and makes it possible to implement an optical intensity-based fiber optic sensor device 100 of a comparatively simple structure.

A process of sensing a changed physical quantity by the signal processing unit 146 using a ratio of the first reflected light reflected by the first fiber Bragg grating unit 120 to the second reflected light reflected by the second fiber Bragg grating unit 125 will be described below.

As shown in FIG. 1, the first fiber Bragg grating unit 120 and the second fiber Bragg grating unit 125 respectively have reflectance $R_{11}$ and $R_{12}$ and have Bragg reflection wavelength characteristics (a central wavelength and a full wavelength at half maximum (FWHM)) meeting conditions of the fiber optic sensor device 100.

Describing the principle of operation, light coming out of the light source 110 proceeds to port ① and port ② through the optical circulator 150 and enters into the optical fiber 115. The first reflected light of the incident light corresponding to the Bragg reflection wavelength is reflected by the first fiber Bragg grating unit 120, and light of the other wavelengths passes through the first fiber Bragg grating unit 120 and the fiber optic sensor unit 130 and arrives at the second fiber Bragg grating unit 125. The second reflected light of a wavelength corresponding to the Bragg reflection wavelength of the second fiber Bragg grating unit 125 is reflected by the second fiber Bragg grating unit 125 and enters into port ③ by the optical circulator 150 by way of the fiber optic sensor unit 130. The second reflected light coming out of port ③ is split into a first reflected light reflected by the first fiber Bragg grating unit 120 and a second reflected light reflected by the second fiber Bragg grating unit 125 according to a bias voltage input into the filter unit 142. In addition, the first reflected light and the second reflected light are converted into a first electrical signal and a second electrical signal by the photoelectric conversion unit 144.

Since the monitoring unit 140 is within a short distance, loss of the optical fiber between the light source 110 and the optical circulator 150 and between the optical circulator 150 and the filter unit 142 or the photoelectric conversion unit 144 is ignored. Under such an assumption, optical power $P_{11}$ of the first reflected light reflected by the first fiber Bragg grating unit 120 and entered into the photoelectric conversion unit 144 can be expressed as shown in mathematical expression (1).

$$P_{11} = P_{in} \cdot K_{C1\text{-}2} \cdot K_{fiber1}^2 \cdot R_{11} \cdot K_{C2\text{-}3} \cdot K_{fp} \tag{1}$$

Here, $P_{in}$ denotes an input optical power, $K_{c1\text{-}2}$ denotes a loss generated when the light proceeds from port ① to port ② of the optical circulator 150, $K_{fiber1}$ denotes a loss between port ② of the optical circulator 150 and the first fiber Bragg grating unit 120, $R_{11}$ denotes reflectance of the first fiber Bragg grating unit 120, $K_{c2-3}$ denotes a loss generated when the light proceeds from port ② to port ③ of the optical circulator 150, and $K_{fp}$ denotes a loss of the variable F-P filter unit 142.

In addition, under the same assumption, optical power $P_{12}$ of the second reflected light reflected by the second fiber Bragg grating unit 125 and entered into the photoelectric conversion unit 144 can be expressed as shown in mathematical expression (2).

$$P_{12}=P_{in}\cdot K_{C1\text{-}2}\cdot K_{fiber1}^2 \cdot K_{fiber2}^2 \cdot K_{FBG11}^2 \cdot R_{12} \cdot K_{C2\text{-}3} \cdot K_{fp} \cdot H_{11}^2 \qquad (2)$$

Here, $K_{fiber2}$ denotes a loss between the first fiber Bragg grating unit 120 and the second fiber Bragg grating unit 125, $K_{FBG11}$ denotes a loss depending on a transfer spectrum of the first fiber Bragg grating unit 120, $R_{12}$ denotes reflectance of the second fiber Bragg grating unit 125, and $H_{11}$ denotes a transfer function of the fiber optic sensor unit 130 $S_{11}$.

Measurement parameter $X_{11}$ can be defined as shown below using mathematical expressions (1) and (2).

$$X_{11} = \frac{P_{11}}{P_{12}} = \frac{K_{fiber2}^2 \cdot K_{FBG11}^2 \cdot R_{12}}{R_{11}} \cdot H_{11}^2 = \beta_{11} \cdot H_{11}^2 \qquad (3)$$

Here, $\beta_{11}$ is a calibration factor, which is the same as $(H_{11}^2=1)X_{11}$ when the optical fiber has no loss. Since $H_{11}$ can be obtained through $X_{11}$, if the ratio of intensity of light $X_{11}$ is changed, a physical quantity can be calculated from mathematical expression (3).

In addition, if it is assumed that bias voltage of the variable F-P filter unit 142 which passes a wavelength corresponding to the reflective wavelength of the first fiber Bragg grating unit 120 is $V_{fp11}$ and change of the bias voltage of the variable F-P filter unit 142 is $\Delta V_{11}$ when the reflective wavelength of the first fiber Bragg grating unit 120 is changed due to change of temperature, since the maximum output at all the bias voltages $V_{11}=V_{fp11}+\Delta V_{11}$ of the F-P filter unit 142 in which the reflective wavelength of the first fiber Bragg grating 120 can be positioned is measured as $P_{11}$, a change in the reflective wavelength of the fiber Brag grating caused by the change of temperature does not influence the result of measurement.

Although the reflective wavelength of the fiber Brag grating is changed as the intensity of incident light and the temperature are changed, $H_{11}$ according to mathematical expression (3) derived from mathematical expressions (1) and (2) remains constant.

According to the principles described above, the fiber optic sensor device 100 according to the embodiment may sense a change in physical quantity generated by the fiber optic sensor unit 130. In addition, since the fiber optic sensor device 100 is advantageous in that an expensive reference fiber Bragg grating which is required in a conventional wavelength-based fiber Bragg grating sensor structure is not needed and the change in physical quantity is measured regardless of a change in incident light, a change in temperature or the like, cost can be saved when an interrogator is implemented.

Figure 2:
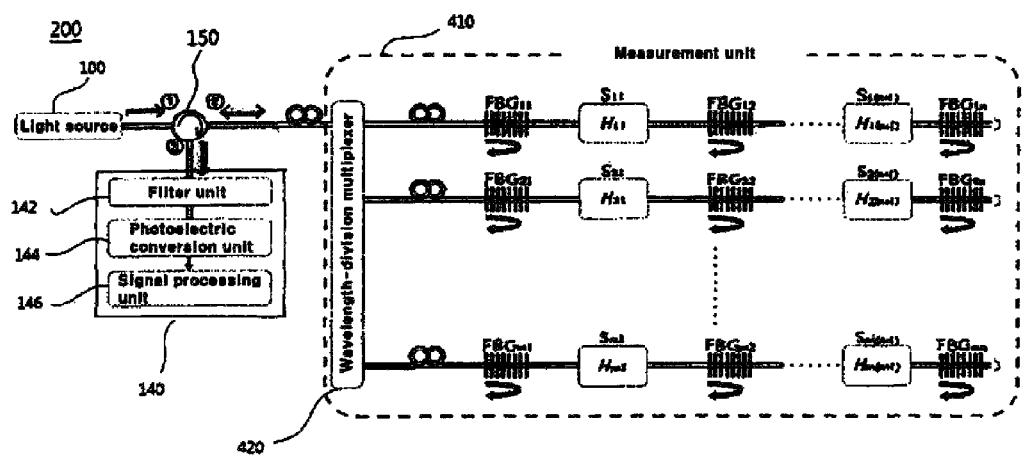
FIG. 2 is a view showing a fiber optic sensor device including a plurality of fiber Bragg gratings and a plurality of fiber optic sensor units in a measurement unit according to an embodiment of the present invention.

Hereinafter, a case of including a plurality of fiber Bragg gratings and a plurality of fiber optic sensor units will be described with reference to FIG. 2. FIG. 2 is a view showing a case of a fiber optic sensor device including a plurality of fiber Bragg gratings and a plurality of fiber optic sensor units in a measurement unit 410 according to an embodiment of the present invention. Compared with the fiber optic sensor device of FIG. 1, the fiber optic sensor device 200 of FIG. 2 includes a plurality of fiber Bragg gratings and a plurality of fiber optic sensor units in the measurement unit 410, and it is confirmed that these are multiplexed by a wavelength-division multiplexer 420 for each optical fiber.

Specifically, as shown in FIG. 2, each optical fiber configures a row and includes n fiber Bragg grating units and n−1 fiber optic sensor units respectively arranged between the n fiber Bragg grating units. Here, n is a natural number.

In addition, the monitoring unit 140 senses a specific physical quantity changed by the fiber optic sensor unit arranged between two adjacent fiber Bragg grating units based on a ratio of intensity of light between two lights reflected by two fiber Bragg grating units adjacent to each other in the optical fiber.

In addition, there is provided m optical fibers (m is a natural number), and the wavelength-division multiplexer 420 splits light entering from the light source 110 by the wavelength and inputs the split light into m optical fibers. Here, the wavelength-division multiplexer 420 determines the unit of splitting a wavelength according to the reflective wavelength bands of all the fiber Bragg gratings included in each optical fiber.

In addition, all the plurality of fiber Bragg gratings included in the measurement unit 410 may have different Bragg reflective characteristics.

As described above, the fiber optic sensor device 200 including a plurality of fiber Bragg gratings and a plurality of optical fiber measurement units may sense a wide range of change in physical quantity.

In addition, the fiber optic sensor device 100 may be placed far away since the monitoring unit 140 and the fiber optic sensor unit 130 are connected using the optical fiber 115, and since measurement points separated but multiplexed by the wavelength-division multiplexer in parallel may have a different length, respectively, there is no restriction in the distance between a monitoring point and a measurement point.

In addition, as shown in FIG. 2, an optical intensity-based fiber optic sensor unit is positioned between two fiber Bragg gratings, and a physical quantity generated by the optical intensity-based fiber optic sensor unit may be known by obtaining a calibration factor $\beta_{mn}$ through $X_{mn}$ measured as shown in mathematical expression (3), and since m*(n−1) optical intensity-based fiber optic sensor units can be arranged, measurement can be simultaneously performed at several points.

In addition, since the structure of the optical intensity-based fiber optic sensor unit positioned between two fiber Bragg gratings is changed depending on a physical quantity desired to be measured, a physical quantity desired by a user can be measured, and sensitivity can be appropriately adjusted according to the structure of the fiber optic sensor unit.

In addition, since the optical intensity-based fiber optic sensor unit positioned between two fiber Bragg gratings is configured as a part of an optical fiber, a measurement range can be adjusted as is desired by a user without restriction in the length of a section desired to be measured, from a point sensor to distributed sensors.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

The present invention is applicable to a fiber optic sensor device industry as a sensor device for sensing a physical quantity using fiber Bragg gratings.

The invention claimed is:

1. A fiber optic sensor device comprising:
   a light source for generating light;
   an optical fiber into which the light generated by the light source enters;
   a first fiber Bragg grating unit arranged in the optical fiber to reflect some of the light generated by the light source;
   a fiber optic sensor unit arranged in the optical fiber to change intensity of the light passing through the first fiber Bragg grating unit based on a specific physical quantity;
   a second fiber Bragg grating unit arranged in the optical fiber to reflect some of the light passing through the fiber optic sensor unit; and
   a monitoring unit for sensing the specific physical quantity changed by the fiber optic sensor unit based on a ratio of intensity of light between a reflected light reflected by the first fiber Bragg grating unit and a reflected light reflected by the second fiber Bragg grating unit.

2. The device according to claim 1, wherein the monitoring unit includes:
   a filter unit for selectively passing a first reflected light reflected by the first fiber Bragg grating unit and a second reflected light reflected by the second fiber Bragg grating unit;
   an photoelectric conversion unit for converting the first reflected light and the second reflected light passing through the filter unit into a first electrical signal and a second electrical signal, respectively; and
   a signal processing unit for calculating a ratio of strength of light between the first reflected light and the second reflected light using the first electrical signal and the second electrical signal and sensing the specific physical quantity changed by the fiber optic sensor unit based on the ratio of strength of light.

3. The device according to claim 2, wherein the filter unit is a variable Fabry-Perot (F-P) filter for selectively passing light of a specific wavelength according to a bias voltage.

4. The device according to claim 2, wherein the photoelectric conversion unit is a photo diode for converting light into an electrical signal.

5. The device according to claim 1, wherein the first fiber Bragg grating unit and the second fiber Bragg grating unit have different Bragg reflection wavelength characteristics.

6. The device according to claim 1, wherein the fiber optic sensor unit is an intensity-type fiber optic sensor for changing intensity of incident light according to the specific physical quantity and outputting the light.

7. The device according to claim 1, wherein the optical fiber includes n fiber Bragg grating units (n is a natural number) and n−1 fiber optic sensor units respectively arranged between the n fiber Bragg grating units, and the monitoring unit senses the specific physical quantity changed by the fiber optic sensor unit arranged between two fiber Bragg grating units adjacent to each other within the optical fiber based on the ratio of strength of light between two reflected light reflected by the two adjacent fiber Bragg grating units.

8. The device according to claim 7, further comprising a wavelength-division multiplexer for splitting light entering from the light source by wavelength and inputting the split light into m optical fibers, wherein there is provided m optical fibers (m is a natural number).

* * * * *